(12) United States Patent
Sanders et al.

(10) Patent No.: US 10,379,927 B2
(45) Date of Patent: Aug. 13, 2019

(54) PROGRAMMABLE CLOCK MONITOR

(71) Applicant: Xilinx, Inc., San Jose, CA (US)

(72) Inventors: Lester S. Sanders, Albuquerque, NM (US); Shravanthi Katam, Secunderabad (IN); Abhinaya Katta, Hyderabad (IN); Jayaram Pvss, Hyderabad (IN)

(73) Assignee: XILINX, INC., San Jose, CA (US)

( * ) Notice: Subject to any disclaimer, the term of this patent is extended or adjusted under 35 U.S.C. 154(b) by 117 days.

(21) Appl. No.: 15/340,978

(22) Filed: Nov. 1, 2016

(65) Prior Publication Data

US 2018/0121280 A1 May 3, 2018

(51) Int. Cl.
| | |
|---|---|
| *G06F 11/00* | (2006.01) |
| *G06F 11/07* | (2006.01) |
| *G06F 11/16* | (2006.01) |
| *G06F 1/12* | (2006.01) |
| *G06F 1/08* | (2006.01) |
| *G06F 11/30* | (2006.01) |

(52) U.S. Cl.
CPC .......... *G06F 11/0757* (2013.01); *G06F 1/08* (2013.01); *G06F 1/12* (2013.01); *G06F 11/079* (2013.01); *G06F 11/0736* (2013.01); *G06F 11/0751* (2013.01); *G06F 11/0772* (2013.01); *G06F 11/1604* (2013.01); *G06F 11/3058* (2013.01)

(58) Field of Classification Search
CPC .......... G06F 11/0751; G06F 11/0757; G06F 11/1604
See application file for complete search history.

(56) References Cited

U.S. PATENT DOCUMENTS

| | | | | | |
|---|---|---|---|---|---|
| 4,864,574 | A | * | 9/1989 | Pritt | G06F 1/10 327/144 |
| 5,081,629 | A | * | 1/1992 | Criswell | G06F 1/04 708/532 |
| 5,291,494 | A | * | 3/1994 | Bruckert | G06F 11/0724 714/24 |
| 6,000,040 | A | * | 12/1999 | Culley | G06F 11/0745 714/31 |

(Continued)

FOREIGN PATENT DOCUMENTS

WO 2015092487 6/2015

OTHER PUBLICATIONS

Freescale Semiconductor, "Using the Clock Generation Module on the HC12 'D' Family," AN2189/D, 2004, pp. 1-16, Freescale Semiconductor, Inc., now NXP Semiconductor, San Jose, California, USA.

(Continued)

*Primary Examiner* — Charles Ehne
(74) *Attorney, Agent, or Firm* — Kevin T. Cuenot

(57) ABSTRACT

An apparatus can include an interface circuit configured to receive an operating parameter and a control circuit coupled to the interface circuit and configured to store the operating parameter. The apparatus also can include a clock error detection circuit coupled to the control circuit. The clock error detection circuit can be configured to detect a clock error condition on a clock signal based upon the operating parameter and, responsive to detecting the clock error condition, generate a signal indicating an occurrence of the clock error condition.

18 Claims, 4 Drawing Sheets

(56) References Cited

U.S. PATENT DOCUMENTS

| | | | |
|---|---|---|---|
| 6,543,027 B1* | 4/2003 | Hughes | G11C 7/1018 |
| | | | 327/20 |
| 8,937,496 B1 | 1/2015 | Ahmad et al. | |
| 9,135,431 B2 | 9/2015 | Yu et al. | |
| 2007/0050672 A1 | 3/2007 | Mangione-Smith | |
| 2007/0230647 A1* | 10/2007 | Pourbigharaz | H04L 7/0083 |
| | | | 375/371 |
| 2011/0219208 A1* | 9/2011 | Asaad | G06F 15/76 |
| | | | 712/12 |
| 2012/0216067 A1 | 8/2012 | Whatmough et al. | |
| 2013/0038352 A1* | 2/2013 | Gupta | H03K 5/19 |
| | | | 327/20 |
| 2015/0033101 A1* | 1/2015 | Chebruch | G06F 11/0751 |
| | | | 714/798 |

OTHER PUBLICATIONS

Luo, Pei et al., "Faulty Clock Detection for Crypto Circuits Against Differential Fault Analysis Attack," Oct. 25, 2014, pp. 1-7, IACR Cryptology ePrint, <http://eprint.iacr.org/2014/883/20160213:042634>.
Microchip Technology, "Fail-Safe Clock Monitor," downloaded Mar. 29, 2016, pp. 1-3, <http://microchip.wikidot.com/8bit:fscm>.
Newae Technology, "6.2. Tutorial #A2: Introduction to Glitch Attacks (including Glitch Explorer)," downloaded Mar. 29, 2016, pp. 1-28, <http://www.newae.com/sidechannel/cwdocs/tutorialglitch.html>.

* cited by examiner

US 10,379,927 B2

PROGRAMMABLE CLOCK MONITOR

TECHNICAL FIELD

This disclosure relates to integrated circuits (ICs) and, more particularly, to a clock monitor circuit for implementation within an IC.

BACKGROUND

Clock monitoring is an important element of modern electronic system design. Within the functional safety market, for example, fault tolerance of a system is seen as a requirement. Fault tolerance generally refers to the ability of a system to continue operating properly, or at least in a defined and expected manner, in the event of a failure (e.g., a fault) of one or more components of the system. For a system to be considered "fault tolerant," clock monitoring, among other elements, is often required.

In the case of security, clock monitoring is often seen as a requirement to aid systems in fending off attack. One type of attack, for example, is the inducement of a glitch in a clock signal of a system. A clock glitch may induce numerous problems such as causing a processor to skip the execution of an instruction. Skipping execution of an instruction may prevent entire portions of program code from executing. These portions of program code may provide important security features to the system such as login, encryption, decryption, and the like. If a hacker is able to cause execution of such an instruction to be skipped, the system may be vulnerable to attack.

SUMMARY

An embodiment includes an apparatus for monitoring clock signals. The apparatus can include an interface circuit configured to receive an operating parameter and a control circuit coupled to the interface circuit and configured to store the operating parameter. The apparatus also can include a clock error detection circuit coupled to the control circuit. The clock error detection circuit can be configured to detect a clock error condition on a clock signal based upon the operating parameter and, responsive to detecting the clock error condition, generate a signal indicating an occurrence of the clock error condition.

Another embodiment includes a method of monitoring clock signals. The method can include receiving, in a clock monitor circuit, an operating parameter from a processor, updating a clock error detection circuit of the clock monitor based upon the operating parameter, and detecting a clock error condition on a clock signal using the clock error detection circuit based on the operating parameter. The method can include, responsive to detecting the clock error condition, generating a signal indicating an occurrence of the clock error condition.

This Summary section is provided merely to introduce certain concepts and not to identify any key or essential features of the claimed subject matter. Other features of the inventive arrangements will be apparent from the accompanying drawings and from the following detailed description.

BRIEF DESCRIPTION OF THE DRAWINGS

The inventive arrangements are illustrated by way of example in the accompanying drawings. The drawings, however, should not be construed to be limiting of the inventive arrangements to only the particular implementations shown. Various aspects and advantages will become apparent upon review of the following detailed description and upon reference to the drawings.

DETAILED DESCRIPTION

Figure 1:
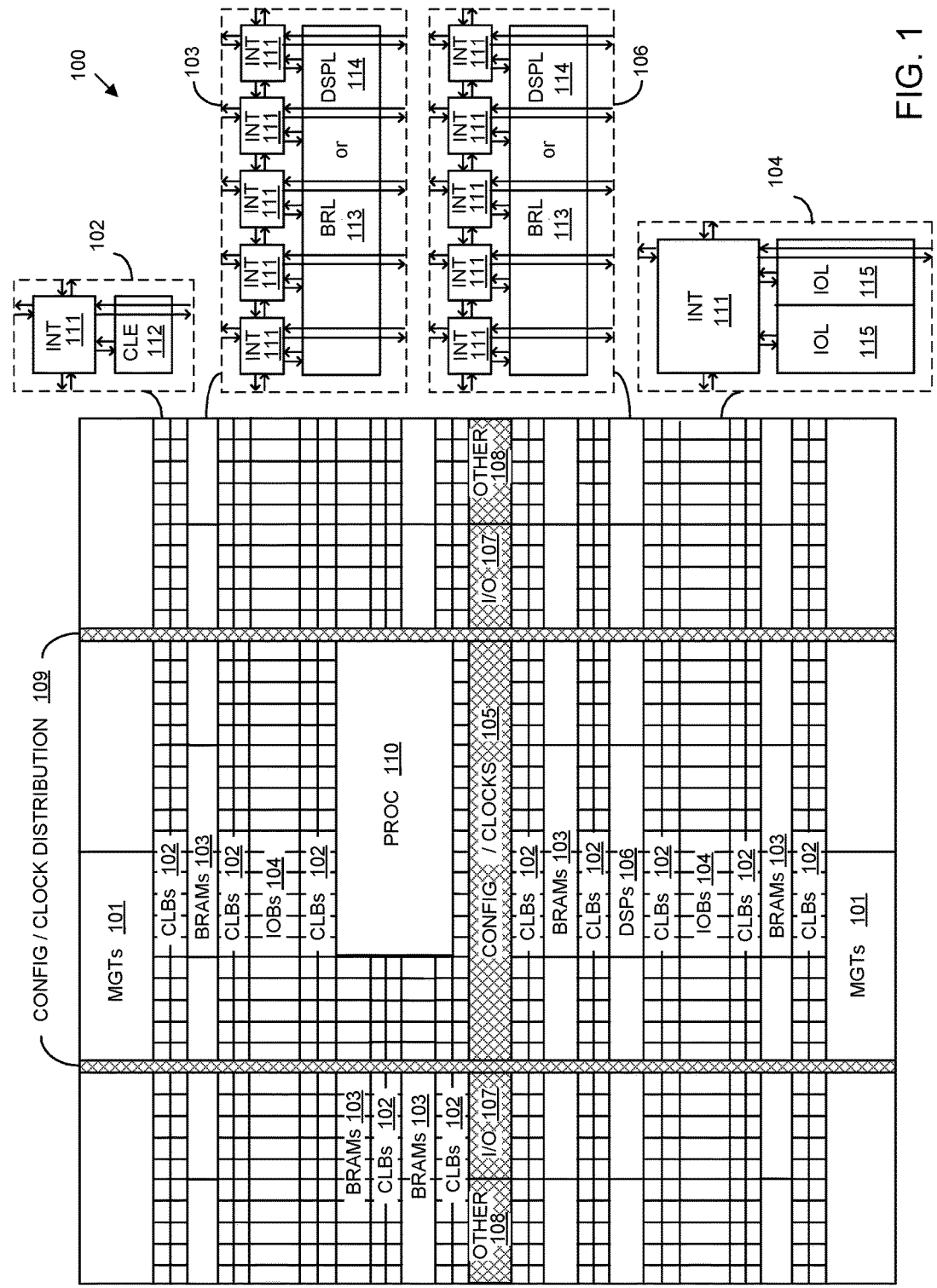
FIG. 1 is an example architecture for an integrated circuit.

While the disclosure concludes with claims defining novel features, it is believed that the various features described within this disclosure will be better understood from a consideration of the description in conjunction with the drawings. The process(es), machine(s), manufacture(s) and any variations thereof described herein are provided for purposes of illustration. Specific structural and functional details described within this disclosure are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

This disclosure relates to integrated circuits (ICs) and, more particularly, to a clock monitor circuit for implementation within an IC. One or more example embodiments described herein provide a clock monitor circuit that facilitates the implementation of a fault tolerant system within an IC. In one aspect, the clock monitor circuit is programmable.

In one or more embodiments, a core is provided that implements the clock monitor circuit. A circuit designer, e.g., a user, may provide one or more operating parameters to an electronic design automation (EDA) tool to program and/or parameterize the core. Further, once the core is physically implemented within the IC as functioning circuitry, the clock monitor circuit may be programmed, or controlled, in real time. In one embodiment, the clock monitor circuit may be controlled using a processor. The processor, for example, may execute driver program code that facilitates communication with the clock monitor circuit. As such, during operation, e.g., in real time, the processor may change one or more of the operating parameters of the clock monitor circuit.

In one or more embodiments, the clock monitor circuit is capable of monitoring one or more different clock signals concurrently. Further, the clock monitor circuit is capable of being programmed to detect one or more different types of clock error conditions on each of the different clock signals being monitored. A processor is capable of interacting with the clock monitor circuit to handle detected clock error conditions. The processor is capable of taking action responsive to clock error conditions detected by the clock monitor circuit based, at least in part, upon the particular clock signal upon which a clock error condition is detected and/or the type of clock error condition detected on the monitored clock signal(s).

Further aspects of the clock monitor circuit, operation of the clock monitor circuit, and programmability of the clock monitor circuit are described herein in greater detail with reference to the drawings. For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

FIG. 1 illustrates an example architecture 100 for an IC. In one aspect, architecture 100 is implemented within a programmable IC. For example, architecture 100 may be used to implement a field programmable gate array (FPGA). Architecture 100 is also representative of a system-on-chip (SOC) type of IC. An SOC is an IC that includes a processor that executes program code and one or more other circuits. The other circuits may be implemented as hardwired circuitry, programmable circuitry, and/or a combination thereof. The circuits may operate cooperatively with one another and/or with the processor. The other circuitry is typically on a same die as the processor.

As shown, architecture 100 includes several different types of programmable circuit, e.g., logic, blocks. For example, architecture 100 may include a large number of different programmable tiles including multi-gigabit transceivers (MGTs) 101, configurable logic blocks (CLBs) 102, random access memory blocks (BRAMs) 103, input/output blocks (IOBs) 104, configuration and clocking logic (CONFIG/CLOCKS) 105, digital signal processing blocks (DSPs) 106, specialized I/O blocks 107 (e.g., configuration ports and clock ports), and other programmable logic 108 such as digital clock managers, analog-to-digital converters, system monitoring logic, and so forth.

In some ICs, each programmable tile includes a programmable interconnect element (INT) 111 having standardized connections to and from a corresponding INT 111 in each adjacent tile. Therefore, INTs 111, taken together, implement the programmable interconnect structure for the illustrated IC. Each INT 111 also includes the connections to and from the programmable logic element within the same tile, as shown by the examples included at the top of FIG. 1.

For example, a CLB 102 may include a configurable logic element (CLE) 112 that may be programmed to implement user logic plus a single INT 111. A BRAM 103 may include a BRAM logic element (BRL) 113 in addition to one or more INTs 111. Typically, the number of INTs 111 included in a tile depends on the height of the tile. As pictured, a BRAM tile has the same height as five CLBs, but other numbers (e.g., four) also may be used. A DSP tile 106 may include a DSP logic element (DSPL) 114 in addition to an appropriate number of INTs 111. An IOB 104 may include, for example, two instances of an I/O logic element (IOL) 115 in addition to one instance of an INT 111. As will be clear to those of skill in the art, the actual I/O pads connected, for example, to IOL 115 typically are not confined to the area of IOL 115.

In the example pictured in FIG. 1, a columnar area near the center of the die, e.g., formed of regions 105, 107, and 108, may be used for configuration, clock, and other control logic. Horizontal areas 109 extending from this column are used to distribute the clocks and configuration signals across the breadth of the programmable IC.

Some ICs utilizing the architecture illustrated in FIG. 1 include additional logic blocks that disrupt the regular columnar structure making up a large part of the IC. The additional logic blocks may be programmable blocks and/or dedicated circuitry. For example, a processor block depicted as PROC 110 spans several columns of CLBs and BRAMs.

In one aspect, PROC 110 is implemented as a dedicated circuitry, e.g., as a hardwired processor, that is fabricated as part of the die that implements the programmable circuitry of the IC. PROC 110 may represent any of a variety of different processor types and/or systems ranging in complexity from an individual processor, e.g., a single core capable of executing program code, to an entire processor system having one or more cores, modules, co-processors, interfaces, or the like.

In another aspect, PROC 110 is omitted from architecture 100 and replaced with one or more of the other varieties of the programmable blocks described. Further, such blocks may be utilized to form a "soft processor" in that the various blocks of programmable circuitry may be used to form a processor that can execute program code as is the case with PROC 110.

The phrase "programmable circuitry" refers to programmable circuit elements within an IC, e.g., the various programmable or configurable circuit blocks or tiles described herein, as well as the interconnect circuitry that selectively couples the various circuit blocks, tiles, and/or elements according to configuration data that is loaded into the IC. For example, circuit blocks shown in FIG. 1 that are external to PROC 110 such as CLBs 102 and BRAMs 103 are considered programmable circuitry of the IC.

In general, the functionality of programmable circuitry is not established until configuration data is loaded into the IC. A set of configuration bits may be used to program programmable circuitry of an IC such as an FPGA. The configuration bit(s) typically are referred to as a "configuration bitstream." In general, programmable circuitry is not operational or functional without first loading a configuration bitstream into the IC. The configuration bitstream effectively implements a particular circuit design within the programmable circuitry. The circuit design specifies, for example, functional aspects of the programmable circuit blocks and physical connectivity among the various programmable circuit blocks.

Circuitry that is "hardwired" or "hardened," i.e., not programmable, is manufactured as part of the IC. Unlike programmable circuitry, hardwired circuitry or circuit blocks are not implemented after the manufacture of the IC through the loading of a configuration bitstream. Hardwired circuitry is generally considered to have dedicated circuit blocks and interconnects, for example, that are functional without first loading a configuration bitstream into the IC, e.g., PROC 110.

In some instances, hardwired circuitry may have one or more operational modes that can be set or selected according to register settings or values stored in one or more memory elements within the IC. The operational modes may be set, for example, through the loading of a configuration bitstream into the IC. Despite this ability, hardwired circuitry is not considered programmable circuitry as the hardwired circuitry is operable and has a particular function when manufactured as part of the IC.

In the case of an SOC, the configuration bitstream may specify the circuitry that is to be implemented within the programmable circuitry and the program code that is to be executed by PROC 110 or a soft processor. In some cases, architecture 100 includes a dedicated configuration processor that loads the configuration bitstream to the appropriate configuration memory and/or processor memory. The dedicated configuration processor does not execute user-specified program code. In other cases, architecture 100 may utilize PROC 110 to receive the configuration bitstream, load the configuration bitstream into appropriate configuration memory, and/or extract program code for execution.

FIG. 1 is intended to illustrate an exemplary architecture that may be used to implement an IC that includes programmable circuitry, e.g., a programmable fabric. For example, the number of logic blocks in a column, the relative width of the columns, the number and order of columns, the types of logic blocks included in the columns, the relative sizes of the logic blocks, and the interconnect/logic implementations included at the top of FIG. 1 are purely exemplary. In an actual IC, for example, more than one adjacent column of CLBs is typically included wherever the CLBs appear, to facilitate the efficient implementation of a user circuit design. The number of adjacent CLB columns, however, may vary with the overall size of the IC. Further, the size and/or positioning of blocks such as PROC 110 within the IC are for purposes of illustration only and are not intended as limitations.

In many programmable ICs, numerous clocks exist upon which clock error conditions may occur. This is particularly true in the case of SOCs. In the case of an SOC, there may be one or more clocks dedicated for use by the processor and/or the processor system and one or more other clocks dedicated for use by circuits implemented within the programmable circuitry of the SOC. Still, there may be clocks utilized by both the processor system and the programmable circuitry.

In one or more embodiments, clock monitor circuits may be implemented using the programmable circuitry of architecture 100 and used to monitor for the occurrence of clock error conditions on one or more of the clocks signals concurrently, whether the clock signals are for use by the processor system and/or the programmable circuitry. Further, the clock monitor circuit(s) are capable of monitoring for different types of clock error conditions on a plurality of clocks signals concurrently.

Figure 2:
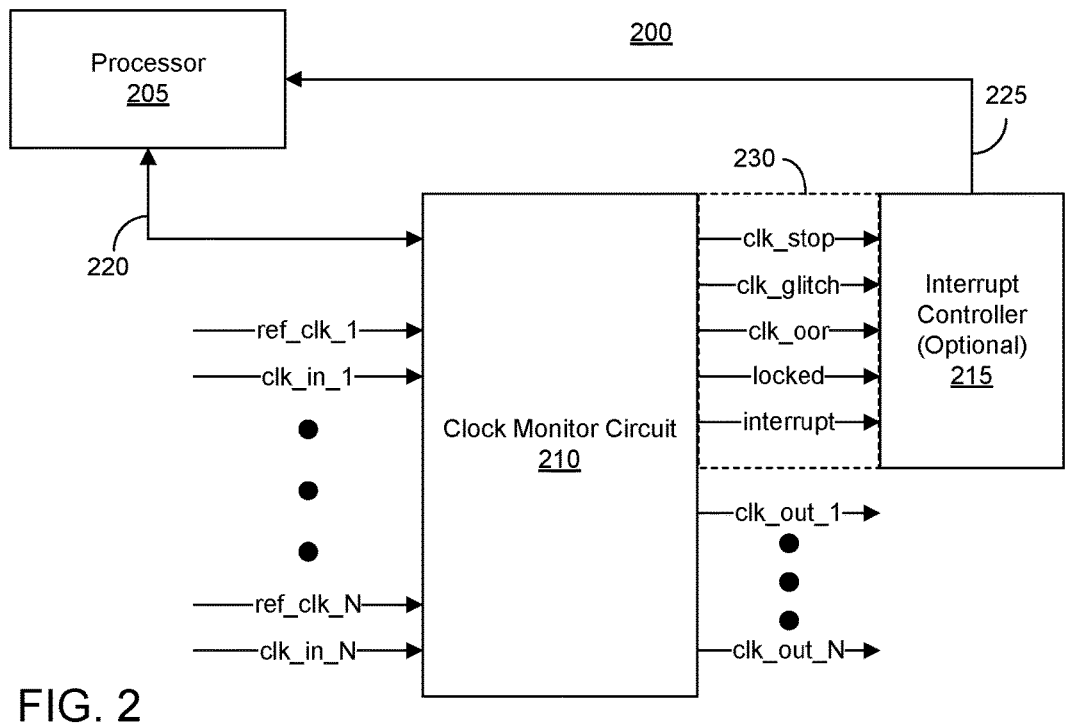
FIG. 2 is an example of an integrated circuit including a clock monitor circuit.

FIG. 2 is an example of an IC 200 including a clock monitor circuit. In one aspect, IC 200 is a programmable IC that includes programmable circuitry. For example, IC 200 may be implemented as an FPGA or other variety of programmable IC. In another example, IC 200 may be implemented as an SOC. IC 200 may have an architecture the same as or similar to that illustrated in FIG. 1. As pictured, IC 200 includes a processor 205 and a clock monitor circuit 210. IC 200 may include an optional interrupt controller 215.

Processor 205 is circuitry capable of executing program code, e.g., instructions. In one embodiment, processor 205 is hardened circuitry. In another embodiment, processor 205 is a soft processor implemented using programmable circuitry of IC 200 responsive to loading configuration data into configuration memory cells of IC 200. Processor 205 may have any of a variety of different architectures capable of executing program code. Processor 205 may be implemented on a same die as clock monitor circuit 210.

Processor 205 may execute program code such as an operating system, a user application, and so forth. Processor 205 further may execute driver program code, e.g., a driver, that enables processor 205 to communicate with clock monitor circuit 210 via connection 220. Connection 220 may be implemented as one or more wires implementing any of a variety of on-chip interconnections.

In one embodiment, connection 220 is implemented as a bus. In one example, the bus may be an AMBA extensible Interface (AXI) bus. An AXI bus is an embedded microcontroller bus interface for use in establishing on-chip connections between circuit blocks and/or systems. It should be appreciated that the example bus types provided herein are for purposes of illustration and not limitation. The inventive arrangements are not limited to the examples provided as other buses and/or connection types may be used.

Clock monitor circuit 210 is configured to monitor one or more different clock signals. For example, a designer may, while working through an EDA tool, include a clock monitor core within a circuit design. The designer may indicate which of a plurality of clock signals of the circuit design to be implemented within IC 200 are to be monitored by the clock monitor core. The designer may specify one or more clock signals up to "N" different clock signals, where N is an integer value. For purposes of description and ease of illustration, the maximum value of N may be 4. It should be appreciated that the example value of 4 is not intended as a limitation. The value of N may be set to 1, 2, 3, or more than 4 depending upon the particular implementation of the clock monitor circuit.

In the example of FIG. 1, clock monitor circuit 210 receives clock signals illustrated as "clk_in_1" through "clk_in_N". In the case of an SOC including FPGA circuitry, the clock signals that may be monitored include clock signals generated in the processor system (e.g., a hardwired portion of IC 200 implementing the processor, interfaces, and/or peripherals in communication with programmable circuitry of IC 200) or any arbitrary clock signal within the programmable circuitry. Clock monitor circuit 210 is configurable to monitor for one or more or each of a plurality of different clock error conditions concurrently on one or more (e.g., 1-N) different clock signals. Examples of the clock error conditions that clock monitor circuit 210 is capable of detecting include, but are not limited to, clock out of range (e.g., a clock overrun and/or a clock underrun), a clock glitch, and/or loss of a clock signal, for each of clock signals 1-N.

For each clock signal to be monitored, clock monitor circuit 210 is coupled to, e.g., receives, a reference clock signal denoted as "ref_clk_1" through "ref_clk_N". Clock monitor circuit 210 is capable of monitoring each of the clock signals for one or more different types of clock error conditions. Each of the reference clock signals may obtained from a device pin or from another internal clock.

Responsive to detecting a clock error condition, clock monitor circuit 210 is capable of generating an interrupt signal as shown. Further, clock monitor circuit 210 is capable of outputting a signal indicating the type of clock error condition detected. For example, clock monitor circuit 210 is capable of generating values on a clk_stop signal indicating the detection of a clock stop error condition, values on a clk_glitch signal indicating the detection of a clock glitch error condition, and values on a clk_oor signal indicating the detection of a clock out of range error condition. The clk_stop, clk_glitch, clk_oor, locked, and interrupt signals may be collectively referred to as signals 230.

In one embodiment, each of the clk_stop, clk_glitch, locked, and clk_oor signals may be a multibit signal so that clock monitor circuit 210 is capable of indicating which of the 1-N monitored clock signals an error condition is detected. The "locked" signal indicates whether the monitored clock signal(s) have started or restarted as expected. Clock monitor circuit 210 is also capable of outputting each of the monitored clock signals 1-N to provide such signals to other circuits and/or systems within IC 200.

As noted, IC 200 may include an optional interrupt controller 215. Interrupt controller 215 is capable of receiving the clk_stop, clk_glitch, clk_oor, locked, and interrupt signals, decoding the signals, and providing an interrupt signal 225 to processor 205. Interrupt controller 215 may be used in cases where one or more different circuits are configured to generate interrupts to processor 205. For example, IC 200 may include more than one clock monitor circuit 210, one or more clock monitor circuits 210 and one or more other circuits configured to generate interrupts, and so forth. Interrupt controller 215 is capable of receiving, prioritizing, and combining signals from two or more interrupt sources (e.g., circuits) and providing resulting value(s) to processor 205 via interrupt signal 225 having applied any prioritization scheme implemented therein. Interrupt signal 225 may include, or convey, the same or similar data received from clock monitor circuit 210 by way of the clk_stop, clk_glitch, clk_oor, locked, and/or interrupt signals. For example, signal 225 may be a multibit signal.

In another embodiment, interrupt controller 215 is omitted. In that case, signals 230 provided from clock monitor circuit 210 to interrupt controller 215 may be provided directly to processor 205. In another embodiment, the interrupt from clock monitor circuit 210 is provided directly from clock monitor circuit 210 to processor 205, e.g., to an interrupt input port, while other signals such as the clock stop, clk_glitch, clk_oor, and locked signals are provided to processor 205 via connection 220.

In one or more embodiments, processor 205 is capable of controlling operation of clock monitor circuit 210. Processor 205, for example, in executing the driver for clock monitor circuit 210, may send instructions to clock monitor circuit 210. The instructions may include one or more operating parameters. The instructions and/or operating parameters control various aspects of how clock monitor circuit 210 detects clock error conditions on clock signals 1-N. Using connection 220, processor 205 is able to control, e.g., modify, the operation of clock monitor circuit 210 dynamically, e.g., in real time, during operation of IC 200.

Figure 3:
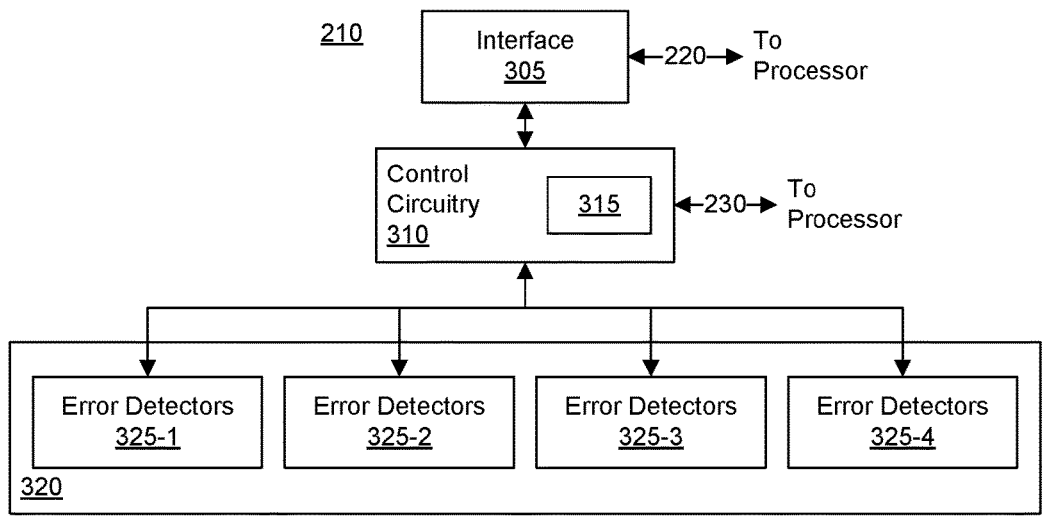
FIG. 3 is an example of a clock monitor circuit.

FIG. 3 is an example implementation of clock monitor circuit 210. Clock monitor circuit 210 includes an interface 305, control circuitry 310, and clock error detection circuit 320. In the example of FIG. 3, control circuitry 310 includes a control register 315, e.g., a memory, for storing operating parameters and/or clock error detection data. Clock error detection circuit 320 includes one or more (e.g., 1-N) error detectors 325. For purposes of illustration, the value of N is presumed to be 4. As such, clock monitor circuit 210 includes 4 error detectors 325 shown as 325-1, 325-2, 325-3, and 325-4 (e.g., one error detector for each clock signal being monitored).

Interface 305 is capable of receiving instructions that specify or include operating parameters from processor 205 during operation of IC 200. Interface 305 further is capable of sending data to processor 205. In one embodiment, interface 305 is a bus interface. For example, interface 305 may be implemented as an AXI bus interface. As shown, interface 305 is coupled to processor 205 via connection 220.

Control circuitry 310 is coupled to interface 305 and to clock error detection circuit 320. In one embodiment, instructions received from processor 205, e.g., operating parameters, are stored in control register 315. Control register 315 may include sufficient storage to store one or more operating parameters for each of error detectors 325. In another embodiment, control register 315 includes sufficient storage for storing clock error detection data generated by error detectors 325. In one embodiment, processor 205 is capable of reading clock error detection data from control register 315 via interface 305 and connection 220. In another embodiment, processor 205 is capable of receiving output data generated by error detectors 325 and stored in control register 315 through signals 230.

In a further embodiment, control circuitry 310 is capable of generating the interrupt signal shown in FIG. 1. For example, control circuitry 310 is capable of monitoring the individual clock error detection signals from each of error detectors 325 to be described herein in greater detail with reference to FIG. 4. Responsive to detecting a clock error condition on one or more of the clock signals being monitored, control circuitry 310 is capable of generating appropriate value(s) on the interrupt signal, e.g., either bringing the interrupt signal high or low depending upon the particular implementation of clock monitor circuit 210.

Figure 4:
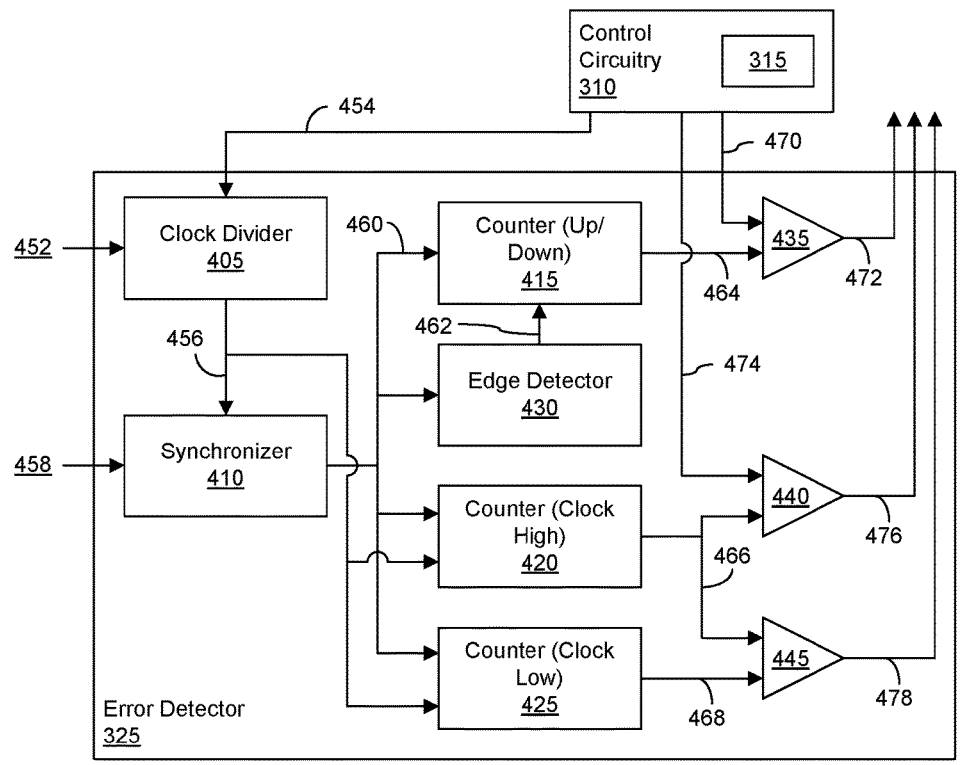
FIG. 4 is an example of a clock error detection circuit.

FIG. 4 is an example of error detector 325. In one embodiment, clock monitor circuit 210 includes one error detector 325 for each clock signal to be monitored. Error detector 325 includes a clock divider 405, a synchronizer 410, counters 415, 420, and 425, an edge detector 435, and comparators 435, 440, and 445.

As discussed, operating parameters for the various circuit blocks illustrated in FIG. 4 may be initially specified for the clock monitor core. Operating parameters may be updated during operation by the processor sending instruction(s) to the clock monitor circuit once implemented. In one embodiment, the processor may obtain one or more operating parameters and send the operating parameters to the clock monitor circuit. Control circuitry 310 may calculate one or more other operating parameters from the operating parameters received from the processor and then provide the calculated operating parameters to the various circuit blocks as needed.

In another embodiment, the processor, e.g., in executing the driver program code, is capable of receiving or obtaining one or more operating parameters. The processor is capable of calculating one or more other operating parameters from the received or obtained operating parameters. The processor is capable of sending the calculated operating parameters to the clock monitor circuit. In that case, control circuitry 310 is capable of providing the operating parameters received from the processor to the various circuit blocks of error detector 325 as needed and need not perform any calculations.

As pictured, clock divider 405 receives a clock signal 452 (e.g., clk_in_N) to be monitored. Clock divider 405 is capable of dividing clock signal 452 by a finite value (e.g., divisor). Clock divider 405 effectively reduces the frequency of clock signal 452 based upon the divisor to facilitate further calculations. Clock divider 405 is further capable of sending the divided version of clock signal 452 shown as signal 456 to synchronizer 410.

In one example, the divisor used to divide clock signal 452 is 32. It should be appreciated that the particular value of the divisor used to divide clock signal 452 may be set or determined based upon the operating parameters initially specified for the clock monitor core. Further, the particular value of the divisor used to divide clock signal 452 is programmable and may be changed during operation of the clock monitor circuit.

As pictured, control circuitry 310 is capable of providing the value of the divisor, which is an operating parameter of clock monitor circuit, to clock divider 405 via signal 454. In one embodiment, the divisor may be calculated based upon operating parameters such as the frequency of the reference signal and a user specified tolerance. In one embodiment, the processor is capable of receiving or obtaining an updated frequency of the reference signal and/or an updated tolerance and calculating an updated value of the divisor for clock divider 405. The processor is capable of providing the updated value of the divisor to the clock monitor circuit. Control circuitry 310 is capable of providing the updated value of the divisor to clock divider 405 via signal 454.

Alternatively, the processor provides one or more operating parameters to the clock monitor circuit such as an updated frequency of the reference clock and/or an updated tolerance. In that case, control circuitry 310 is capable of calculating the value of the divisor provided to clock divider 405. Control circuitry 310 calculates the value of the divisor and provides the divisor to clock divider 405 via signal 454.

In still another embodiment, the processor is capable of obtaining, e.g., reading, the divisor from an input or a memory. The processor is capable of providing the divisor to control circuitry 310. Control circuitry 310 is capable of providing the divisor to clock divider 405 via signal 454.

Synchronizer 410 receives frequency divided signal 456 and a reference signal 458 (e.g., ref_clk_N). Synchronizer 410 is capable of synchronizing signal 456 with signal 458 and outputting a synchronized version of signal 458 as signal 460. The remainder of error detector 325 operates using signal 460.

Figure 5:
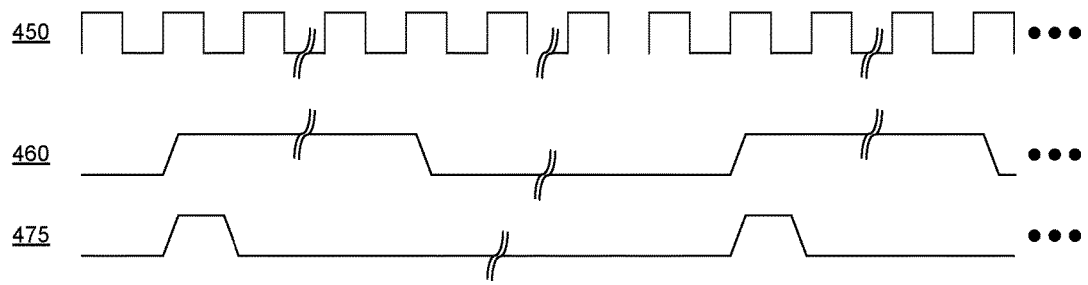
FIG. 5 illustrates example waveforms illustrating operation of an edge detector for the clock monitor circuit.

Edge detector 430 receives signal 460. Edge detector 430 is capable of detecting a rising edge, or rising edges, on signal 460. Edge detector 430 is capable of generating output signal 462 indicating the detected edges and providing signal 462 to counter 415. FIG. 5 illustrates example waveforms for signals 452, 456, and 462 showing operation of edge detector 430.

In one embodiment, counter 415 is implemented as an up/down counter. Counter 415 is capable of operating as a free running counter operating on signal 460. In one embodiment, counter 415 is capable of resetting the counter value stored therein to zero responsive to detecting a high on signal 460, which is the edge detected signal. As such, counter 415 utilizes cyclic edge detection on signal 460 within established limits. The value calculated by counter 415 is output to comparator 435 as signal 464.

In one embodiment, counter 420 is implemented as a clock high counter. Clock 420 is capable of counting the number of reference clock cycles (of signal 460) that fit into the high time of signal 456 (e.g., the divided version of clock signal 452). The value determined by counter 420 is output to comparator 440 and to comparator 445 as signal 466.

In one embodiment, counter 425 is implemented as a clock low counter. Counter 425 is capable of counting the number of reference clock cycles (of signal 460) that fit into the low time of signal 456. The value determined by counter 425 is output to comparator 446 as signal 468.

As discussed, for each clock signal to be monitored, a designer may specify values for the frequency of the clock signal ($F_{user}$), the frequency of the reference signal used to monitor the clock signal ($F_{reference}$), and a tolerance ($F_{tolerance}$). Further, the processor may update the operating parameters of the clock monitor circuit based upon these values during operation of the clock monitor circuit in real time. As discussed, the processor and/or control circuitry 310 is capable of using these operating parameters to calculate further operating parameters.

Comparator 435 is capable of comparing signal 464 from counter 415 with signal 470 from control circuitry 310. In one aspect, signal 470 specifies an upper bound and/or a lower bound to which signal 464 is compared. Comparator 435 is capable of performing the comparison to determine whether clock signal 452 is free running or stuck at "0" or "1" some portion of the time. If the value of counter 415, as output on signal 464, exceeds the upper bound or goes below the lower bound, comparator 435 determines that signal 462 (e.g., the edge detected signal) has not gone high for at least a minimum amount of time which indicates that clock signal 452 is stopped (e.g., stuck at "1" or "0"). Comparator 435 generates signal 472 (e.g., clk_stop) and pulls the signal high or low depending upon the implementation of the clock monitor circuit to indicate the detection of a clock stopped error condition on clock signal 452.

The value(s) specified by signal 470 are examples of operating parameters of the clock monitor circuit that may be user specified when parameterizing the core and/or programmed dynamically in real time during operation. In one embodiment, the upper bound and the lower bound may be obtained by the processor and provided to control circuitry 310. In another embodiment, the processor may calculate the upper bound and/or the lower bound based upon other user provided operating parameters such as the clock frequency, the reference frequency, and/or the tolerance. In still another embodiment, the processor may provide the clock frequency, the reference frequency, and/or the tolerance to control circuitry 310 and control circuitry 310 may calculate the upper bound and/or the lower bound. In any case, the upper bound and/or the lower bound may be provided to comparator 435 via signal 470.

Comparator 440 receives signal 466 from counter 420 and signal 474 from control circuitry 310. As discussed, signal 466 indicates the amount of time that signal 460 is high. Signal 474 specifies a value of Count_2. Comparator 440 is capable of comparing signal 466 with Count_2 (signal 474). If the value of signal 466 exceeds Count_2, then more reference clock cycles fit within a cycle of clock signal 452 than are permitted indicating that the frequency of clock signal 452 is lower than permitted (e.g., clock underrun). If the value of signal 466 is less than Count_2, then fewer reference clock cycles fit within a cycle of clock signal 452 than permitted indicating that the frequency of clock signal 452 is higher than permitted (e.g., clock overrun). In either case, comparator 440 generates signal 476 (e.g., clk_oor) indicating that the frequency of signal 452 is out of range. For example, comparator 440 may pull signal 476 high or low depending upon the implementation of the clock monitor circuit to indicate the out of range clock error condition on clock signal 452.

The value of Count_2, as specified by signal 474, is another example of an operating parameter of the clock monitor circuit that may be user specified when parameterizing the core and/or programmed dynamically in real time during operation. In one embodiment, Count_2 may be obtained by the processor and provided to control circuitry 310. In another embodiment, the processor may calculate Count_2 based upon other user provided operating parameters such as the clock frequency, the reference frequency, and/or the tolerance. In still another embodiment, the processor may provide the clock frequency, the reference frequency, and/or the tolerance to control circuitry 310 and control circuitry 310 may calculate Count_2. In any case, Count_2 may be provided to comparator 440 via signal 474.

Comparator 445 receives signal 466 and signal 468 from counter 425. As discussed, signal 466 indicates the amount of time that signal 460 is high. Signal 468 indicates the amount of time that signal 460 is low. Comparator 445 is capable of comparing signal 466 with signal 468. Comparator 445 is capable of determining whether the value of signal 466 matches the value of signal 468. If the values of signals 466 and 468 do not match, e.g., are not within a predetermine range or tolerance of one another, comparator 445 determines that a glitch error condition has occurred on clock signal 452 and generates signal 478 (e.g., clk_glitch). For example, comparator 445 may pull signal 478 high or low depending upon the implementation of the clock monitor circuit to indicate the occurrence of a glitch on clock signal 452.

In one example embodiment, signals 472, 476, and 478 are provided to one or more other circuits. In another example embodiment, signals 472, 476, and 478 are provided to control circuitry 310. Control circuitry 310, for example, can include circuitry that generates an interrupt signal responsive to the detection of an error condition or error conditions on any monitored clock signal (from any of the plurality of error detectors 325). For example, in the case where the clock monitor circuit includes N different error detectors 325, control circuitry 310 is capable of receiving the equivalents of signals 472, 476, and 478 from each of error detectors 325 and generate an interrupt signal to be provided to an interrupt controller and/or a processor responsive to the detection of a clock error condition on any of the monitored clock signals. It should be appreciated that signals 472, 476, and 478 from each of error detectors 325 may be provided to one or more other circuits and also to control circuitry 310.

For purposes of illustration and not limitation, further examples of calculating one or more of the operating parameters described above are shown below. The operating parameters that may be calculated by the processor or control circuitry 310 using the particular expressions shown. Each of the values may be updated dynamically during operation of the clock monitor circuit to modify operation thereof. In one embodiment, the Count_stop parameter may be used as the upper bound specified by signal 470.

$$\text{Counterl\_width} = 10 + \log_2 \frac{1}{F_{tolerance}} \quad (1)$$

$$\text{Counterl\_value} = 2^{Counterl\_width} \quad (2)$$

$$\text{User\_clock\_counts} = (F_{reference} * \text{Counterl\_value})/F_{user} \quad (3)$$

$$\text{Count\_stop} = \text{User\_clock\_counts} * 10 \quad (4)$$

$$\text{Count\_2} = \text{User\_clock\_counts}/2 \quad (5)$$

Figure 6:
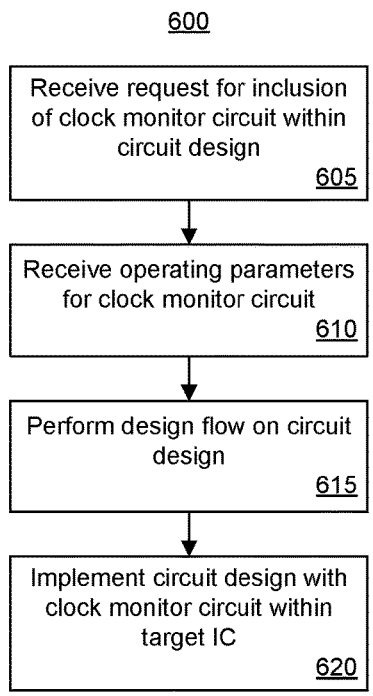
FIG. 6 is an example method of implementing a clock monitor circuit.

FIG. 6 is an example method 600 of implementing a clock monitor circuit within a circuit design. Method 600 may be performed by an EDA tool (hereafter "a system"). An example of an EDA tool is a data processing system, e.g., a computer, executing suitable operational software such as an operating system and an EDA application. Method 600 may begin in a state where a designer is using the system and has created or loaded a circuit design therein.

In block 605, the system receives a request or instruction to include a clock monitor circuit within the circuit design. In block 610, the system receives one or more operating parameters for the clock monitor circuit. For example, in response to the request to include a clock monitor circuit within the circuit design, the system may present a user interface through which the designer may provide values as initial operating parameters for the clock monitor circuit. These operating parameters may specify information such as the number of clock signals to be monitored, the particular clock signals to be monitored, and so forth. Further operating parameters that may be received and stored by the system include, but are not limited to, on a per monitored clock signal basis, the frequency of the monitored clock signal, the reference clock to be used, the frequency of the reference clock, and the tolerance.

In one aspect, the operating parameters described in block 610 may be referred to as initial operating parameters since the system persists the values and uses the values for purposes of processing the circuit design, including the clock monitor core, through a design flow. It should be appreciated that more than one clock monitor circuit may be included in the circuit design depending upon the number of clock signals to be monitored. For example, if the number of clock signals of the circuit design to be monitored exceeds N clock signals, in reference to the maximum number of clocks signals that a single clock monitor core may monitor, additional clock monitor circuits may be included.

In block 615, the system performs a design flow on the circuit design. As part of the design flow, the system is capable of performing synthesis, placement, routing, and bitstream generation. In block 620, the system implements the resulting circuit design with the clock monitor circuit(s) in a target IC. It should be appreciated that the circuit design may be loaded by the system into the target IC or loaded by another system (e.g., one capable of loading the circuit design into the target IC at volume) into a plurality of ICs.

Figure 7:
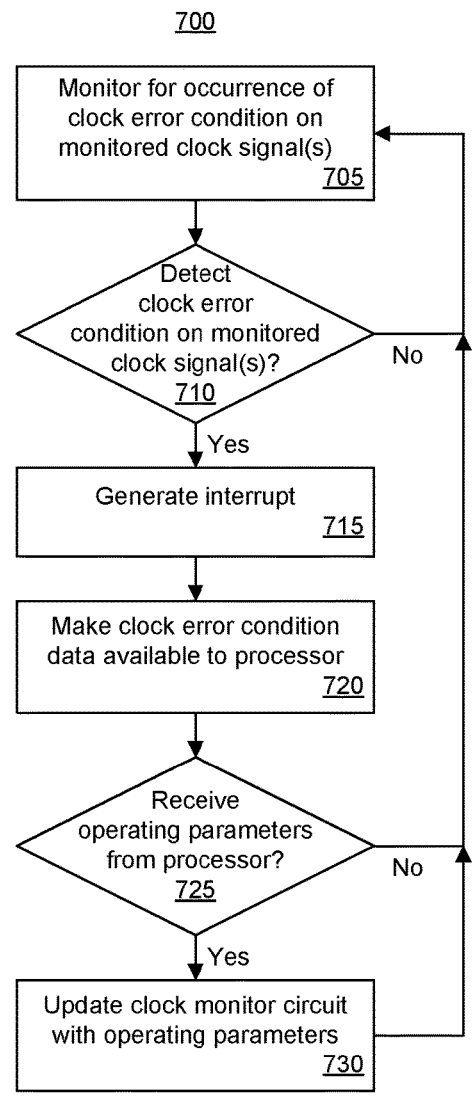
FIG. 7 is an example method of operation for a clock monitor circuit.

FIG. 7 is an example method 700 of operation for a clock monitor circuit within an IC. Method 700 may begin in a state where a circuit design including a clock monitor circuit is implemented within a target IC. For purposes of illustration and ease of description, one clock monitor circuit is presumed, though more than one clock monitor circuit may be included in the target IC.

In block 705, the clock monitor circuit begins monitoring for the occurrence of a clock error condition on each of the monitored clock signals of the circuit design. In block 710, the clock monitor circuit determines whether a clock error condition is detected on one or more of the monitored clock signals. If so, method 700 continues to block 715. If not, method 700 loops back to block 705.

In block 715, responsive to detecting a clock error condition, the clock monitor circuit generates an interrupt to the processor. The interrupt may be provided directly to the processor or may be provided to an interrupt controller that is coupled to the processor.

In block 720, the clock monitor circuit provides clock error condition data to the processor or otherwise makes such data available to the processor. For example, the clock monitor circuit, having detected the clock error condition(s), is aware of the particular clock signal(s) upon which the clock error condition(s) are detected and the type of clock error conditions detected. In one embodiment, the clock monitor circuit provides the data to the processor via one or more signals coupled to the processor. In another embodiment, responsive to receiving the interrupt, the processor may read the data from the clock monitor circuit.

It should be appreciated that the processor, having obtained the clock error condition data, may implement one or more of a plurality of different interrupt handling routines. The processor, for example, may have access to a plurality of different interrupt handling routines and select a particular one for execution based upon the clock signal(s) upon which the clock error condition is detected and/or the type(s) of error clock condition detected. For example, the processor may reset a clock signal, shut down all or a portion of the target IC, or perform another action. The ability to detect different clock error conditions on one or more different clocks allows the processor to respond to each clock error condition or combination of clock error conditions with a custom or tailored response rather than using one exception handling approach that is generic to all clock signals and/or clock error conditions.

In block 725, the clock monitor circuit determines whether the processor has provided new and/or updated operating parameters. As discussed, the processor may execute a driver that allows the processor to send new and/or updated operating parameters to the clock monitor circuit. If the clock monitor circuit receives operating parameters from the processor, method 700 continues to block 730. If not, the clock monitor circuit loops back to block 705 to continue monitoring for further clock error conditions on the monitored clock signals.

In block 730, the clock monitor circuit updates the operating parameters stored therein with operating parameters received from the processor in block 725. In one embodiment, the processor, in executing the driver program code, is capable of calculating updated values for example operating parameters as described herein including, but not limited to, Counter1_width, Counter1_value, User_clock_counts, Count_stop, and Count_2. For example, the processor may receive inputs during operation for one or more clock signals such as an updated frequency of a monitored clock signal, an updated frequency of a reference clock, and/or an updated tolerance. The processor may, in response to receiving the new and/or updated inputs, calculated updated values for Counter1_width, Counter1_value, User_clock_counts, Count_stop, and Count_2 for the relevant clock signal(s). The processor is further capable of sending the calculated operating parameters to the clock monitor circuit. The values may be stored in the control register and provided to the relevant circuit blocks of the clock monitor circuit as previously described herein.

In another embodiment, the processor may receive inputs during operation for one or more clock signals such as an updated frequency of a monitored clock signal, an updated frequency of a reference clock signal, and/or an updated tolerance. The processor may, in response to receiving the new and/or updated inputs, provide the updated values to the clock monitor circuit. In that case, the controller circuitry may receive the values. The controller circuitry is capable of calculating example operating parameters as described herein including, but not limited to, values for Counter1_width, Counter1_value, User_clock_counts, Count_stop, and Count_2 for the relevant clock signals from the received values. The updated values may be stored in the control register and provided to the relevant circuit blocks of the clock monitor circuit as previously described.

In still another embodiment, the processor may obtain or read the operating parameters to be updated within the clock monitor circuit such that neither the processor nor the controller circuitry need calculate updated values. In illustration, the processor may obtain or read values for example operating parameters as described herein including, but not limited to, Counter1_width, Counter1_value, User_clock_counts, Count_stop, and Count_2. The processor is further capable of sending the operating parameters to the clock monitor circuit. The values may be stored in the control register and provided to the relevant circuit blocks of the clock monitor circuit as previously described herein. After block 730, method 700 may loop back to block 705 to continue operating.

For purposes of explanation, specific nomenclature is set forth to provide a thorough understanding of the various inventive concepts disclosed herein. The terminology used herein, however, is for the purpose of describing particular aspects of the inventive arrangements only and is not intended to be limiting.

As defined herein, the singular forms "a," "an," and "the" are intended to include the plural forms as well, unless the context clearly indicates otherwise. As defined herein, the term "another" means at least a second or more. As defined herein, the terms "at least one," "one or more," and "and/or," are open-ended expressions that are both conjunctive and disjunctive in operation unless explicitly stated otherwise. For example, each of the expressions "at least one of A, B and C," "at least one of A, B, or C," "one or more of A, B, and C," "one or more of A, B, or C," and "A, B, and/or C" means A alone, B alone, C alone, A and B together, A and C together, B and C together, or A, B and C together. As defined herein, the term "automatically" means without user intervention.

As defined herein, the term "computer readable storage medium" means a storage medium that contains or stores program code for use by or in connection with an instruction execution system, apparatus, or device. As defined herein, a "computer readable storage medium" is not a transitory, propagating signal per se. A computer readable storage medium may be, but is not limited to, an electronic storage device, a magnetic storage device, an optical storage device, an electromagnetic storage device, a semiconductor storage device, or any suitable combination of the foregoing. Memory elements, as described herein, are examples of a computer readable storage medium. A non-exhaustive list of more specific examples of a computer readable storage medium may include: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing.

As defined herein, the term "coupled" means connected, whether directly without any intervening elements or indirectly with one or more intervening elements, unless otherwise indicated. Two elements may be coupled mechanically, electrically, or communicatively linked through a communication channel, pathway, network, or system. As defined herein, the terms "includes," "including," "comprises," and/or "comprising," specify the presence of stated features, integers, steps, operations, elements, and/or components, but do not preclude the presence or addition of one or more other features, integers, steps, operations, elements, components, and/or groups thereof. As defined herein, the term "output" means storing in physical memory elements, e.g., devices, writing to display or other peripheral output device, sending or transmitting to another system, exporting, or the like. As defined herein, the term "plurality" means two or more than two.

As defined herein, the term "if" means "when" or "upon" or "in response to" or "responsive to," depending upon the context. Thus, the phrase "if it is determined" or "if [a stated condition or event] is detected" may be construed to mean "upon determining" or "in response to determining" or "upon detecting [the stated condition or event]" or "in response to detecting [the stated condition or event]" or "responsive to detecting [the stated condition or event]" depending on the context. As defined herein, the term "responsive to" means responding or reacting readily to an action or event. Thus, if a second action is performed "responsive to" a first action, there is a causal relationship between an occurrence of the first action and an occurrence of the second action. The term "responsive to" indicates the causal relationship.

As defined herein, the terms "one embodiment," "an embodiment," or similar language mean that a particular feature, structure, or characteristic described in connection with the embodiment is included in at least one embodiment described within this disclosure. Thus, appearances of the phrases "in one embodiment," "in an embodiment," and similar language throughout this disclosure may, but do not necessarily, all refer to the same embodiment.

As defined herein, the term "processor" means at least one hardware circuit configured to carry out instructions contained in program code. The hardware circuit may be an integrated circuit. Examples of a processor include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, a graphics processing unit (GPU), a controller, and so forth.

As defined herein, the term "real time" means a level of processing responsiveness that a user or system senses as sufficiently immediate for a particular process or determination to be made, or that enables the processor to keep up with some external process. As defined herein, the term "user" means a human being. The terms first, second, etc. may be used herein to describe various elements. These elements should not be limited by these terms, as these terms are only used to distinguish one element from another unless stated otherwise or the context clearly indicates otherwise.

In some instances, the term "signal" may be used within this disclosure to describe physical structures such as terminals, pins, signal lines, wires. In other instances, the term "signal" may be used to refer to particular values specified by a wire. The term "signal" may refer to the conveyance of a single bit, e.g., a single wire, or the conveyance of multiple parallel bits through multiple parallel wires. Further, each signal may represent bi-directional communication between two, or more, components connected by the signal.

A computer program product may include a computer readable storage medium (or media) having computer readable program instructions thereon for causing a processor to carry out aspects of the inventive arrangements described herein. Within this disclosure, the term "program code" is used interchangeably with the term "computer readable program instructions." Computer readable program instructions described herein may be downloaded to respective computing/processing devices from a computer readable storage medium or to an external computer or external storage device via a network, for example, the Internet, a LAN, a WAN and/or a wireless network. The network may include copper transmission cables, optical transmission fibers, wireless transmission, routers, firewalls, switches, gateway computers and/or edge devices including edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations for the inventive arrangements described herein may be assembler instructions, instruction-set-architecture (ISA) instructions, machine instructions, machine dependent instructions, microcode, firmware instructions, or either source code or object code written in any combination of one or more programming languages, including an object oriented programming language and/or procedural programming languages. Computer readable program instructions may include state-setting data. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider). In some cases, electronic circuitry including, for example, programmable logic circuitry, an FPGA, or a PLA may execute the computer readable program instructions by utilizing state information of the computer readable program instructions to personalize the electronic circuitry, in order to perform aspects of the inventive arrangements described herein.

Certain aspects of the inventive arrangements are described herein with reference to flowchart illustrations and/or block diagrams of methods, apparatus (systems), and computer program products. It will be understood that, for at least some of the flow charts, one or more or each block of the flowchart illustrations and/or block diagrams, and combinations of blocks in the flowchart illustrations and/or block diagrams, may be implemented by computer readable program instructions, e.g., program code.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the operations specified in the flowchart and/or block diagram block or blocks.

The computer readable program instructions may also be loaded onto a computer, other programmable data processing apparatus, or other device to cause a series of operations to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various aspects of the inventive arrangements. In this regard, for at least some of the flow charts, one or more or each block in the flowchart or block diagrams may represent a module, segment, or portion of instructions, which comprises one or more executable instructions for implementing the specified operations.

In some alternative implementations, the operations noted in the blocks may occur out of the order noted in the figures.

For example, two blocks shown in succession may be executed substantially concurrently, or the blocks may sometimes be executed in the reverse order, depending upon the functionality involved. In other examples, blocks may be performed generally in increasing numeric order while in still other examples, one or more blocks may be performed in varying order with the results being stored and utilized in subsequent or other blocks that do not immediately follow. It will also be noted that each block of the block diagrams and/or flowchart illustration, and combinations of blocks in the block diagrams and/or flowchart illustration, may be implemented by special purpose hardware-based systems that perform the specified functions or acts or carry out combinations of special purpose hardware and computer instructions.

The corresponding structures, materials, acts, and equivalents of all means or step plus function elements that may be found in the claims below are intended to include any structure, material, or act for performing the function in combination with other claimed elements as specifically claimed.

An apparatus for monitoring clock signals can include an interface circuit configured to receive an operating parameter, a control circuit coupled to the interface circuit and configured to store the operating parameter, and a clock error detection circuit coupled to the control circuit. The clock error detection circuit is configured to detect a clock error condition on a clock signal based upon the operating parameter and, responsive to detecting the clock error condition, generate a signal indicating an occurrence of the clock error condition.

In one aspect, the clock error detection circuit is configured to detect a plurality of different types of clock error conditions on the clock signal concurrently and indicate which of the plurality of different types of clock error conditions is detected.

In another aspect, the clock error detection circuit is configured to detect the clock error condition on each of a plurality of different clock signals concurrently and indicate the clock signal of the plurality of clock signals with the error condition. For example, the clock error detection circuit is configured to detect a plurality of different types of clock error conditions on each of the plurality of different clock signals and indicate which of the plurality of different types of clock error conditions is detected for each respective clock signal of the plurality of clock signals.

The signal may be provided to a processor and can include an interrupt.

The interface can be coupled to a processor configured to send the operating parameter.

The operating parameter may be used to detect a clock stop error condition, detect a clock glitch error condition, and/or detect a clock out of range error condition.

In a further aspect, the interface circuit, the control circuit, and the clock error detection circuit are implemented in programmable circuitry of an integrated circuit.

A method of monitoring clock signals can include receiving, in a clock monitor circuit, an operating parameter from a processor, updating a clock error detection circuit of the clock monitor based upon the operating parameter, and detecting a clock error condition on a clock signal using the clock error detection circuit based on the operating parameter. The method can also include, responsive to detecting the clock error condition, generating a signal indicating an occurrence of the clock error condition.

In one aspect, detecting a clock error condition includes monitoring for a plurality of different types of clock error conditions on the clock signal concurrently and indicating which of the plurality of different types of clock error conditions is detected.

In another aspect, detecting a clock error condition includes monitoring for the clock error condition on each of a plurality of different clock signals concurrently and indicating the clock signal of the plurality of clock signals with the error condition.

In another aspect, detecting a clock error condition includes monitoring for a plurality of different types of clock error conditions on each of the plurality of different clock signals concurrently and indicating which of the plurality of different types of clock error conditions is detected for each respective clock signal of the plurality of clock signals.

The signal can be provided to a processor and can include an interrupt.

The operating parameter can be received from a processor.

The operating parameter can be used to detect a clock stop error condition, detect a clock glitch error condition, and/or detect a clock out of range error condition.

In a further aspect, the method can include implementing the clock monitor circuit in programmable circuitry of an integrated circuit.

The description of the inventive arrangements provided herein is for purposes of illustration and is not intended to be exhaustive or limited to the form and examples disclosed. The terminology used herein was chosen to explain the principles of the inventive arrangements, the practical application or technical improvement over technologies found in the marketplace, and/or to enable others of ordinary skill in the art to understand the inventive arrangements disclosed herein. Modifications and variations may be apparent to those of ordinary skill in the art without departing from the scope and spirit of the described inventive arrangements. Accordingly, reference should be made to the following claims, rather than to the foregoing disclosure, as indicating the scope of such features and implementations.

What is claimed is:

1. An apparatus for monitoring clock signals, comprising:
    an interface circuit configured to receive an operating parameter;
    a control circuit coupled to the interface circuit and configured to store the operating parameter; and
    a clock error detection circuit coupled to the control circuit, wherein the clock error detection circuit is programmable during operation using the operating parameter to detect a clock error condition on a clock signal and, responsive to detecting the clock error condition, generate a signal indicating an occurrence of the clock error condition;
    wherein the clock error condition is defined, at least in part, by the operating parameter and the clock error detection circuit is configured to detect a clock glitch error condition by comparing a number of reference clock cycles that occur while a frequency divided version of the clock signal is high with a number of reference clock cycles that occur while the frequency divided version of the clock signal is low and determining that the numbers of the reference clock cycles are not within a predetermined range of one another.

2. The apparatus of claim 1, wherein the clock error detection circuit is configured to detect a plurality of different types of clock error conditions on the clock signal concurrently and indicate which of the plurality of different types of clock error conditions is detected.

3. The apparatus of claim 1, wherein the clock error detection circuit is configured to detect the clock error condition on each of a plurality of different clock signals concurrently and indicate the clock signal of the plurality of clock signals with the error condition.

4. The apparatus of claim 3, wherein the clock error detection circuit is configured to detect a plurality of different types of clock error conditions on each of the plurality of different clock signals and indicate which of the plurality of different types of clock error conditions is detected for each respective clock signal of the plurality of clock signals.

5. The apparatus of claim 1, wherein the signal is provided to a processor and comprises an interrupt.

6. The apparatus of claim 1, wherein the interface is coupled to a processor configured to send the operating parameter.

7. The apparatus of claim 1, wherein the operating parameter is used to detect a clock stop error condition.

8. The apparatus of claim 1, wherein the operating parameter is used to detect a clock out of range error condition.

9. The apparatus of claim 1, wherein the interface circuit, the control circuit, and the clock error detection circuit are implemented in programmable circuitry of an integrated circuit.

10. A method of monitoring clock signals, comprising:
receiving, in a clock monitor circuit, an operating parameter;
programming a clock error detection circuit of the clock monitor circuit with the operating parameter during operation;
detecting a clock error condition on a clock signal using the clock error detection circuit, wherein the clock error condition is defined, at least in part, by the operating parameter, wherein the clock error detection circuit is configured to detect a clock glitch error condition by comparing a number of reference clock cycles that occur while a frequency divided version of the clock signal is high with a number of reference clock cycles that occur while the frequency divided version of the clock signal is low and determining that the numbers of the reference clock cycles are not within a predetermined range of one another; and
responsive to detecting the clock error condition, generating a signal indicating an occurrence of the clock error condition.

11. The method of claim 10, wherein the detecting the clock error condition comprises monitoring for a plurality of different types of clock error conditions on the clock signal concurrently and indicating which of the plurality of different types of clock error conditions is detected.

12. The method of claim 10, wherein the detecting the clock error condition comprises monitoring for the clock error condition on each of a plurality of different clock signals concurrently and indicating the clock signal of the plurality of clock signals with the error condition.

13. The method of claim 12, wherein the detecting the clock error condition comprises monitoring for a plurality of different types of clock error conditions on each of the plurality of different clock signals concurrently and indicating which of the plurality of different types of clock error conditions is detected for each respective clock signal of the plurality of clock signals.

14. The method of claim 10, wherein the signal is provided to a processor and comprises an interrupt.

15. The method of claim 10, wherein the operating parameter is received from a processor.

16. The method of claim 10, wherein the operating parameter is used to detect a clock stop error condition.

17. The method of claim 10, wherein the operating parameter is used to detect a clock out of range error condition.

18. The method of claim 10, further comprising implementing the clock monitor circuit in programmable circuitry of an integrated circuit.

* * * * *